(12) United States Patent
Rastegar

(10) Patent No.: US 11,841,227 B2
(45) Date of Patent: Dec. 12, 2023

(54) POLARIZED RADIO FREQUENCY (RF) ANGULAR ORIENTATION SENSOR WITH INTEGRATED COMMUNICATION LINK

(71) Applicant: Omnitek Partners LLC, Ronkonkoma, NY (US)

(72) Inventor: Jahangir S Rastegar, Stony Brook, NY (US)

(73) Assignee: OMNITEK PARTNERS L.L.C., Ronkonkoma, NY (US)

( * ) Notice: Subject to any disclaimer, the term of this patent is extended or adjusted under 35 U.S.C. 154(b) by 0 days.

(21) Appl. No.: 18/123,261

(22) Filed: Mar. 18, 2023

(65) Prior Publication Data

US 2023/0228568 A1   Jul. 20, 2023

Related U.S. Application Data

(63) Continuation of application No. 17/200,842, filed on Mar. 14, 2021, now Pat. No. 11,624,612, which is a continuation of application No. 15/986,765, filed on May 22, 2018, now Pat. No. 10,948,293, which is a continuation of application No. 63/394,210, filed on Aug. 1, 2022.

(60) Provisional application No. 62/510,232, filed on May 23, 2017.

(51) Int. Cl.
| G01C 19/38 | (2006.01) |
| G01C 19/48 | (2006.01) |
| G01S 1/04 | (2006.01) |
| G01S 7/02 | (2006.01) |
| G01S 13/88 | (2006.01) |
| G01S 5/02 | (2010.01) |
| G01S 13/00 | (2006.01) |

(52) U.S. Cl.
CPC ............. *G01C 19/38* (2013.01); *G01C 19/48* (2013.01); *G01S 1/045* (2013.01); *G01S 5/0221* (2013.01); *G01S 5/0247* (2013.01); *G01S 7/024* (2013.01); *G01S 13/88* (2013.01)

(58) Field of Classification Search
None
See application file for complete search history.

(56) References Cited

U.S. PATENT DOCUMENTS

| 2,362,561 | A | * | 11/1944 | Katzin | ............... | H01Q 13/24 333/248 |
| 2,364,371 | A | * | 12/1944 | Katzin | ............... | H01Q 13/0258 333/251 |
| 3,963,195 | A | * | 6/1976 | Coxe | ............... | F41G 7/26 244/3.11 |

(Continued)

FOREIGN PATENT DOCUMENTS

| EP | 0552944 A1 | * | 7/1993 | ............... | H01P 1/161 |
| EP | 0945911 A1 | * | 9/1999 | ............... | H01P 1/161 |

(Continued)

*Primary Examiner* — Bernarr E Gregory

(57) ABSTRACT

A system including a polarized radio frequency (RF) scanning reference source and one or more cavity sensor receivers. The system uses a sensor processor to apply Fourier integration to extract a fundamental frequency and, at least, a fundamental frequency and two predetermined harmonics from the received output of the one or more cavity sensor receivers in determining a reference time of the reference clock.

1 Claim, 12 Drawing Sheets

(56) References Cited

U.S. PATENT DOCUMENTS

| | | | | |
|---|---|---|---|---|
| 4,797,681 A * | 1/1989 | Kaplan | ............... | H01Q 13/0258 333/137 |
| 5,208,602 A * | 5/1993 | Monser et al. | ......... | H01Q 21/26 343/795 |
| 5,796,371 A * | 8/1998 | Sato | ....................... | H01Q 1/247 343/786 |
| 5,977,844 A * | 11/1999 | Baird | ..................... | H01P 1/161 333/135 |
| 6,043,789 A * | 3/2000 | Suzuki | .................... | H01P 1/161 343/786 |
| 6,572,052 B1 * | 6/2003 | Hansen | ................... | F41G 7/305 244/3.14 |
| 6,724,341 B1 * | 4/2004 | Pereira et al. | .......... | G01S 7/024 342/62 |
| 6,727,843 B1 * | 4/2004 | Hansen | ................... | F41G 7/305 342/61 |
| 7,298,255 B1 * | 11/2007 | Pereira | .................... | F41G 7/346 340/552 |
| 7,821,462 B1 * | 10/2010 | Reigle et al. | .......... | H01Q 21/24 343/700 MS |
| 8,076,621 B2 * | 12/2011 | Rastegar | ................. | F41G 7/305 342/61 |
| 8,093,539 B2 * | 1/2012 | Rastegar | ................... | F41G 7/28 244/3.1 |
| 8,258,999 B2 * | 9/2012 | Rastegar | ................. | F42B 15/01 342/61 |
| 8,587,473 B2 * | 11/2013 | Rastegar | ................. | G01B 21/22 342/61 |
| 8,637,798 B2 * | 1/2014 | Rastegar | ................. | F41G 7/346 342/61 |
| 10,038,237 B2 * | 7/2018 | Eastburg et al. | .... | H01Q 21/061 |
| 10,948,293 B2 * | 3/2021 | Rastegar | ................. | G01S 7/024 |
| 11,624,612 B2 * | 4/2023 | Rastegar | ................. | G01C 19/38 342/350 |
| 2010/0059622 A1 * | 3/2010 | Rastegar | ................. | F41G 7/305 701/469 |
| 2010/0220002 A1 * | 9/2010 | Rastegar | ................. | F42B 15/01 342/62 |
| 2012/0199690 A1 * | 8/2012 | Rastegar | ................. | G01B 21/22 342/362 |

FOREIGN PATENT DOCUMENTS

| | | | | |
|---|---|---|---|---|
| EP | 1465282 A1 * | 10/2004 | ............. | H01P 1/161 |
| GB | 2140538 A * | 11/1984 | ............. | F41G 7/305 |
| GB | 2301724 A * | 12/1996 | ............. | F41G 7/305 |
| JP | 9-307305 A * | 11/1997 | ............. | H01P 1/161 |

* cited by examiner

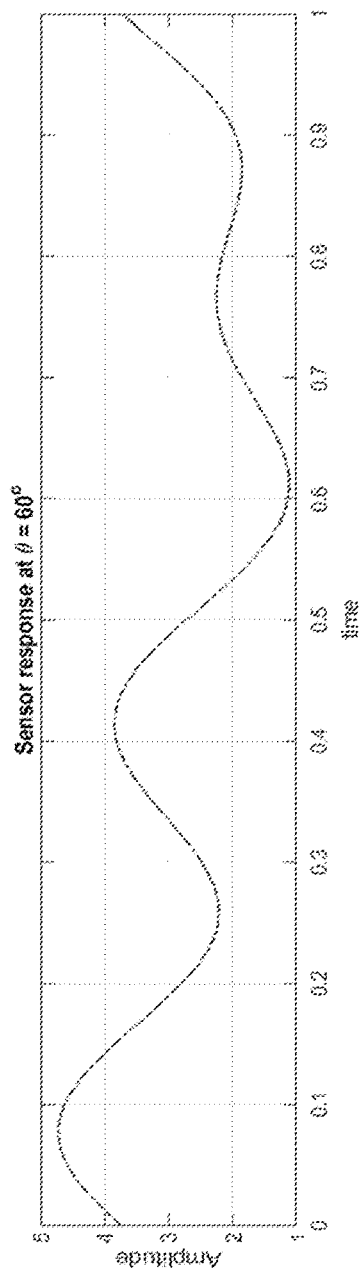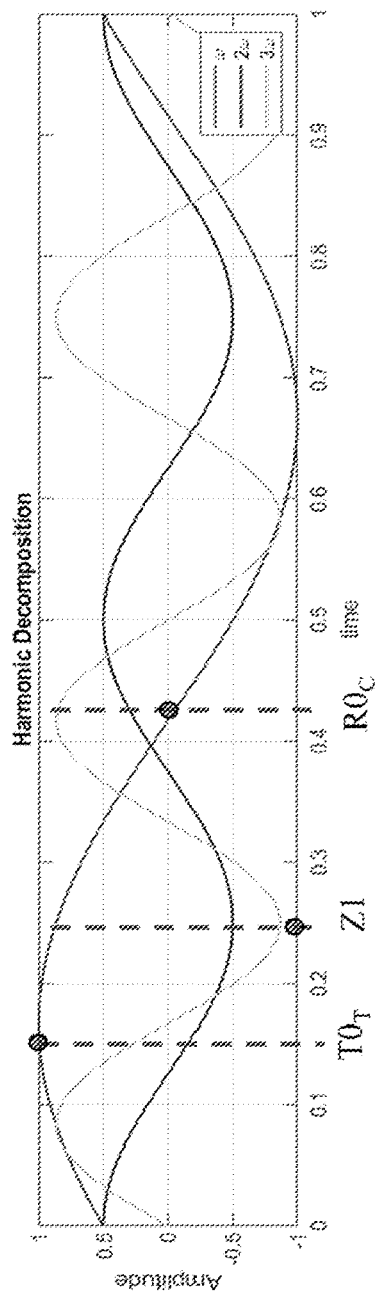
Figure 7a
(PRIOR ART)
Figure 7b
(PRIOR ART)

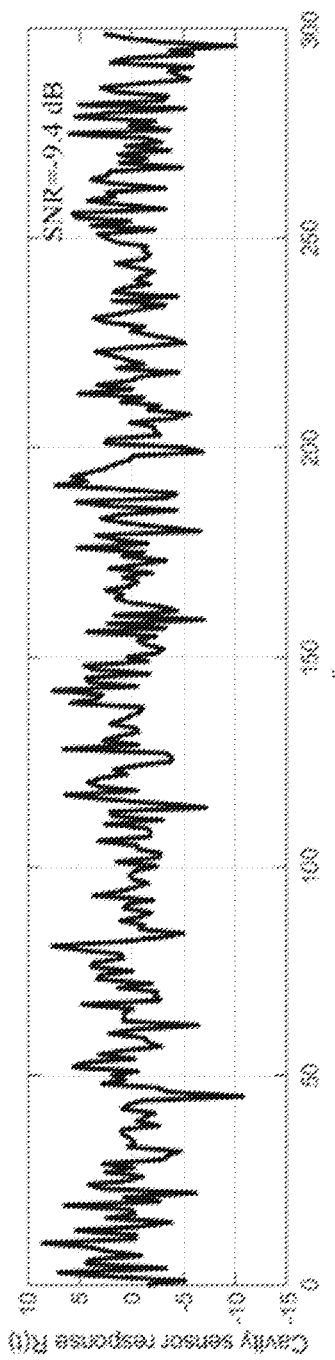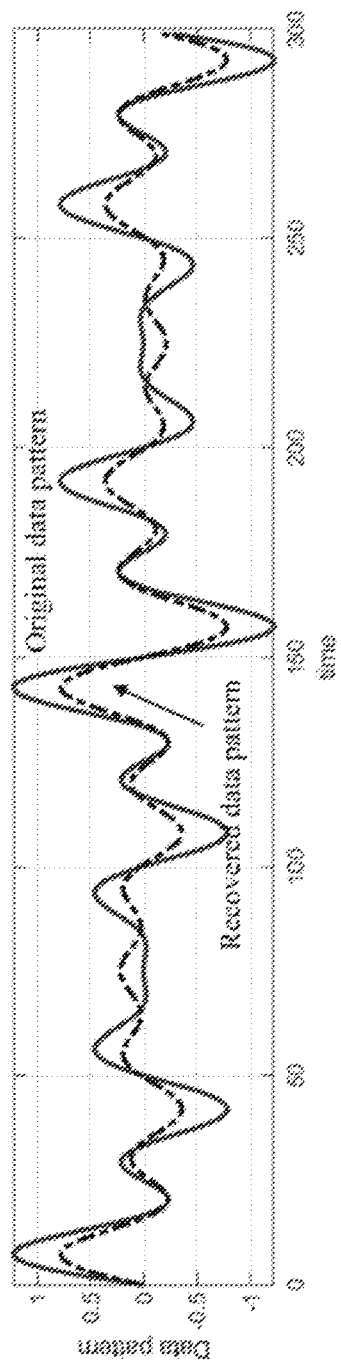
Figure 12a
Figure 12b

POLARIZED RADIO FREQUENCY (RF) ANGULAR ORIENTATION SENSOR WITH INTEGRATED COMMUNICATION LINK

CROSS-REFERENCE TO RELATED APPLICATION

This application is a continuation-in-part of U.S. patent application Ser. No. 17/200,842, filed on Mar. 14, 2021, now U.S. Pat. No. 11,624,612, which is a continuation application of U.S. patent application Ser. No. 15/986,765, filed on May 22, 2018, now U.S. Pat. No. 10,948,293 issued on Mar. 16, 2021, which claims benefit to earlier filed U.S. Provisional Patent Application No. 62/510,232, filed on May 23, 2017, the entire contents of each of which are incorporated herein by reference. This application also claims the benefit of U.S. Provisional patent application Ser. No. 63/394,210, filed on Aug. 1, 2022, the entire contents of which is incorporated herein by reference.

GOVERNMENT RIGHTS

This invention was made with Government support under contracts W15QKN-12-C-0036 and W15QKN-17-C-0004 awarded by the United States Army. The Government has certain rights in the invention.

BACKGROUND

1. Field

The present disclosure relates generally to angular orientation measuring sensors with integrated communication link, more particularly, to systems and methods for sensors for measuring angular orientation of an object/platform using polarized Radio Frequency (RF) signals from scanning polarized RF reference sources with integrated highly secure communication link.

2. Prior Art

In the process of guiding an object/platform, such as an UAV or a UGV or a munition towards its target, particularly when issues such as jamming and spoofing are to be addressed, and when the target is not static and/or the guiding station needs to be in constant contact with the guided object/platform to provide guidance and control information and other necessary one-way or two-way data transfer, it is essential that their communication link be secure. In addition, it is highly desirable to minimize the amount of required data between the guiding station and the object/platform to minimize the possibility of data intercept, jamming and spoofing, for example, by integrating the required guidance sensory data with other communication data.

It is appreciated that it is highly desirable that any information that is transmitted and received between one or more nodes be prevented from being discovered and intercepted, jammed or spoofed. The communication between two or more nodes, particularly if the nodes are not in the line of site of each other, requires the transmission of information and recovery of the transmitted information using radio frequency. As a result, the transmitted sensory and target information, or the electronic communication between two or more nodes, may be detected or jammed by an adversary. The nodes may be UAVs, UGVs, a weapon platform and one or more munitions, fire control stations and other battle management systems, fielded personnel, and the like.

The methods for secure communication between two or more fixed or moving nodes, and the development of related technologies are of particular importance for long range UAV, UGV, guided munitions, even manned platforms since their angular orientation and positioning errors can accumulate during their significantly longer flights and travel, requiring correctional information communication from guidance platforms or central control stations, and with the adversary having more time to detect and jam or spoof the communication information.

Such secure communication capability between a mobile object/platform and its guidance platform, for example, between UAVs and UGVs and munitions and fixed or mobile guidance platforms/stations, is critical for ensuring that the information cannot be detected, jammed, or spoofed and that the object/platform can be guided to its target rapidly and with high precision.

The disclosed innovative method for the development of a highly secure communication system that is seamlessly integrated with an RF based position and orientation sensory system would be configured to conceal the transmitted information, for example updated target position information and other commands from the guidance platforms/stations and any target designating platforms such as UAVs and UGVs.

In certain cases, the onboard position information (absolute or relative to the target, a reference station, another mobile platform, etc.) can be provided by an outside source, for example, by GPS for position or by a radar reading or optical signal that is reflected off some target or received by the mobile platform in line-of-sight conditions. In other cases, it is either required or is highly desirable to have autonomous sensors on board the mobile platform, including gun-fired projectiles, mortars, and missiles, to directly measure its position with respect to a fixed platform (for example a ground station) or a moving platform.

Currently available sensors for remote measurement of the position and certain orientation, e.g., direction of travel, of a platform (object) relative to the earth or another object (target or weapon platform) can be divided into the following five major classes.

The first class of sensors measure changes in the position and orientation of a platform using inertial devices such as accelerometers and gyros. Inertial based sensors, however, generally suffer from drift and noise error accumulation problems. In such sensors, the drift and the measurement errors are accumulated over time since the acceleration must be integrated twice to determine the distance travelled. Thus, the error in the position and orientation measurements increases over time. In addition, the initial linear and angular velocities of the object must be known accurately, which in munitions is difficult to determine due to the initial firing acceleration event and for any object traveling long distances over a considerable length of time. Another shortcoming of inertia-based position sensors is that the position and orientation of one object relative to another object cannot be measured directly, i.e., the position and orientation of each object relative to the inertia frame must be measured separately and used to determine their relative position and orientation. As a result, errors in both measurements are included in the relative position and orientation measurements, thereby increasing them even further. In addition, electrical energy must be spent during the entire time to continuously make acceleration measurements.

In the case of gun-fired munitions, two other major problems are encountered with inertia-based sensors. Firstly, they must be made to withstand firing accelerations that in certain cases could be in excess of 100,000 Gs. However, to achieve the required guidance and control accuracy over relatively long distances and related times, the accelerometer and gyro accuracy must be extremely high. Accelerometers and non-optical gyros also suffer from settling time problems after being subjected to the initial high G shock loading, which further reduces their overall sensory precision. As a result, the development of high precision inertia-based accelerometers and gyros that could withstand the aforementioned high G levels and require near zero settling time is an extremely difficult task.

In addition to the inertia-based position measurement sensors, GPS signals are also used to provide the object position information and direction of travel. Such systems, however, have several significant shortcomings, particularly for munitions applications. These include the fact that GPS signals may not be available along the full path of the flight and that the measurements cannot be made fast enough to make them suitable for guidance and control purposes in munitions, such as gun-fired munitions, mortars and rockets. In addition, GPS signals are generally weak and prone to jamming and spoofing.

The second class of position and orientation measurement systems are based on the use of radio frequency (RF) antennas printed or placed on the surface of an object to reflect RF energy emanating from a ground-based radar system. The reflected energy is then used to track the object on the way to its destination. With such systems, measurement of distance of an object relative to the fixed or moving radar requires enough power to allow detection of the reflected signal, which makes the signal detectable by an adversary and susceptible to jamming and spoofing. In addition, the information about the object distance/position is determined at the radar station and must be transmitted back to the moving object(s) if it is to be used for guidance and/or course correction. It is also very difficult and costly to develop systems that can track multiple projectiles. It is noted that numerous variations of the above method and devices have been devised with all suffering from similar shortcomings.

Another sensory system has also been developed for angular orientation measurement onboard objects based on utilizing polarized Radio Frequency (RF) reference sources and mechanical cavities as described in U.S. Pat. Nos. 6,724,341, 7,193,556 and 7,425,918, each of which are incorporated herein by reference, and hereinafter are referred to as "polarized RF angular orientation sensors". These angular orientation sensors use highly directional mechanical cavities that are very sensitive to the orientation of the sensor relative to the reference source due to the cross-polarization and due to the geometry of the cavity. The reference source may be fixed on the ground or may be another mobile platform (object). Being based on RF carrier signals, the sensors provide a longer range of operation. The sensors can also work in and out of line of sight. In addition, the sensors make angular orientation measurements directly and would therefore not accumulate measurement error. The sensor cavities receive the electromagnetic energy emitted by one or more polarized RF sources. The angular position of the cavity sensor relative to the reference source is indicated by the energy level that it receives. A system equipped with multiple such waveguides can then be used to form a full spatial orientation sensor. In addition, by providing more than one reference source, full spatial position of the munitions can also be measured onboard the munitions.

The polarized RF based angular orientation sensors provide highly precise angular orientation measurements. The sensors, when embedded in a mobile platform such as in a projectile, can measure full angular orientation of the projectile (mobile platform) relative to the fixed ground station or another moving object such as a UAV or another projectile (mobile platform) where the reference source is located. These angular orientation sensors are autonomous, i.e., they do not acquire sensory information through communication with a ground, airborne or the like source. The sensors are relatively small and can be readily embedded into the structure of most mobile platforms including munitions without affecting their structural integrity. Thus, such sensors are inherently shock, vibration and high G acceleration hardened. A considerable volume is thereby saved for use for other gear and added payload. In addition, the sensors become capable of withstanding environmental conditions such as moisture, water, heat and the like, even the harsh environment experienced by munitions during firing. In addition, the sensors require a minimal amount of onboard power to operate since they do not have to be continuously operating and may be used only when the sensory information is needed.

Briefly, referring now to FIGS. 1 and 2, there is shown a representation of a cavity sensor 100 and its operation with respect to a polarized radio frequency (RF) reference (illuminating) source 101. An electromagnetic wave consists of orthogonal electric (E) and magnetic (H) fields. The electric field E and the magnetic field H of the illuminating beam are mutually orthogonal to the direction of propagation of the illumination beam. When polarized, the planes of E and H fields are fixed and stay unchanged in the direction of propagation. Thus, the illuminating source establishes a (reference) coordinate system with known and fixed orientation. The cavity sensor 100 reacts in a predictable manner to a polarized illumination beam. When three or more cavity sensors are distributed over the body of an object, and when the object is positioned at a known distance from the illuminating source, the amplitudes of the signals received by the cavity sensor 100 can be used to determine the orientation of the object relative to the reference (illuminating) source 101, i.e., in the aforementioned reference coordinate system of the reference source 101. The requirement for the proper distribution of the cavity sensors 100 over the body of the object is that at least three of the cavity sensors be neither parallel nor co-planar.

It is therefore observed that the above RF based angular orientation sensors are dependent on the magnitude of the received signal at the cavity sensors from the reference source to determine the orientation of the sensor relative to the reference source. The use of the signal magnitude, however, has several major shortcomings that limit the utility of such sensors as well as degrades their angular orientation measurement precision. The following are the major shortcomings of the use of signal magnitude information in these cavity sensors for measuring angular orientation relative to the polarized RF reference sources:

1. To relate the magnitude of the received signal to angular orientation, the distance from the reference source to the angular orientation sensors must be known. This in general means that other means must be also provided to measure or indicate the position of the orientation sensors relative to the reference source.

2. In practice, the signal received at the angular orientation sensor is usually noisy, it may face losses due to the environmental conditions, and is also prone to measurement errors at the sensor.
3. The magnitude of the signal received at the angular orientation sensors and its relationship to the angular orientation of the sensors (object to which the sensors are attached) could be significantly different when the object is not in the line-of-sight of the reference source. Therefore, when the object is not in the line-of-sight, the received signal magnitude information cannot yield an accurate angular orientation measurement.

The use of polarized RF reference sources with scanning capability that transmits a specific class of constructed signal pattern eliminates the above shortcomings of polarized RF cavity angular orientation sensors. The method of constructing a polarized RF scanning reference source and its operation are described in detail in U.S. Pat. Nos. 8,164,745; 8,259,292; 8,446,577, 8,514,383 and 10,948,293, each of which are incorporated herein by reference. This would be the case since scanning provides the means of transmitting scanning patterns that are detected by the cavity sensors, from which the sensor angular orientation information can be extracted due to the sensitivity of the received signal to the orientation of the cavity sensor relative to the scanning reference source. In addition, since the cavity sensor is used to detect the pattern of the received signal and not its magnitude and since the signal pattern does not change with distance (only the magnitude of the pattern is reduced by distance), therefore the angular orientation measurement becomes independent of the distance between the reference source and the cavity sensor. Another advantage of using polarized RF scanning reference sources is that in non-line-of-sight conditions, since obstacles do not affect the direction of the plane of polarization and only reduce the signal strength, therefore the signal pattern and the angular orientation information is not affected. Another advantage of using polarized RF scanning reference sources is that since noise and effects of reflections and multi-paths for low wavelength (high frequency) RF transmitted signals is random, their net effect can readily be eliminated by proper signal pattern detecting processing.

The method of constructing a polarized RF scanning reference source and its operation is described in detail in the above U.S. patents. In short, referring to FIG. 2, by modulating the amplitudes of the synchronized and polarized fields $E_x$ and $E_y$, the referencing source transmits a scanning polarized vector field $\bar{E}(t)$. By properly modulating the two field amplitudes, the desired vector field scanning pattern is obtained. It is noted that $E_x$ and $E_y$ do not have to be orthogonal.

In general, any desired scanning pattern may be implemented with the present polarized RF scanning reference source. For example, one may choose scanning patterns with peaks that are sharper than a simple harmonic sine wave, thereby increasing the accuracy of a peak detection algorithm. Alternatively, one may add specially configured patterns that will simplify a pattern detection algorithm being used and/or to reject noise, and/or to reduce their susceptibility to detection, jamming and spoofing, or for other application specific purposes.

It is noted that the following method may also be used to provide two or even more simultaneous and arbitrarily oriented scanning reference sources. Such multi-range scanning is useful for the establishment of a network of reference sources and/or to limit the range or radiation when multiple sensors (for example, munitions and/or weapon platforms) are using the reference source.

In general, the signal received by cavity sensors from a polarized RF reference source will be sensitive to changes in orientation about any axis (for example the axes indicated by $\theta_x$, $\theta_y$, and $\theta_z$ in FIG. 1). The cavity sensors may, however, be configured with geometries that when positioned in a certain direction relative to the referencing source they would be more sensitive to change in one orientation and less sensitive to others. For example the cavity sensor 100 shown in the schematic of FIG. 1 may be configured to be highly sensitive to roll (rotation about the axis $Y_{ref}$—or the so-called roll, FIG. 1), and less sensitive to rotations about the axes $X_{ref}$ and $Z_{ref}$, i.e., have high sensitivity to roll and low cross-sensitivity to pitch and yaw.

The polarized RF angular sensory systems are best described as being configured for measuring the roll angle of an object on which the sensor cavity is provided, as shown in the schematic of FIG. 4. FIG. 4 shows a polarized RF scanning reference source 200 to which the XYZ Cartesian coordinate system is fixed. In the coordinate system XYZ, the Z axis is along the direction of the propagating electromagnetic wave D (in the −Z direction using the right-hand rule). A cavity sensor 202 is fixed to an object 204 and is positioned a distance d in far field of the polarized RF scanning reference source. The roll angle θ of the cavity sensor 202 (i.e., of the object 204) is measured from the sensor cavity orientation shown in FIG. 4, such that at the roll angle θ=0 and with polarized fields $E_x$ being transmitted while the polarized field $E_y$ is off, the cavity sensor output is maximum. This roll angle referencing configuration is arbitrary and may be varied but is selected since it simplifies the roll angle measurement calculations described below. In addition, for a symmetrically configured sensor cavity 202 like the horn shaped cavity sensor 100 of FIG. 1, the roll angle θ=0 configuration corresponds to the orientation in which cross-polarization angle of the transmitted polarized field $E_x$ with the receiving cavity sensor terminal is also zero.

Referring to FIG. 5, by modulating the amplitudes of the synchronized and polarized fields $E_x$ and $E_y$, the referencing source transmits a scanning polarized vector field $\bar{E}(t)$. By properly modulating the two field amplitudes, the desired vector field scanning pattern is obtained. It is noted that $E_x$ and $E_y$ do not have to be orthogonal. In the present configuration of FIG. 4, the (roll) angle to be measured by the sensor is the angle θ as shown in FIGS. 4 and 5.

FIG. 5 shows the scanning polarized vector field $\bar{E}(t)$ obtained by modulation of the amplitudes of the synchronized and polarized fields $E_x$ and $E_y$ (traveling in the XZ and YZ planes, respectively) of the polarized RF scanning reference source and the aforementioned roll angle θ. As was previously described, by properly modulating the amplitudes of the two fields $E_x$ and $E_y$, the desired vector field scanning pattern is obtained. It is noted that $E_x$ and $E_y$ do not have to be orthogonal.

The field strength detected by the cavity sensor 202, FIG. 4, at an angle θ is given by the scalar function R(t) as $$R(t)=g(D)f(\bar{E}(t),\theta) \quad (1)$$

where g(D) is the gain related to the distance D between the scanning reference source and the cavity sensor and the existing environmental factors. Since the time taken to make an angle measurement is very small, changes in the gain g(D) during each angle measurement are negligible and the gain g(D) can be considered to stay constant.

The mapping function $f(\bar{E}, \theta)$ is determined by the configuration of the cavity sensor and its calibration. The geometry of the cavity is configured, and the pick-up terminal is located to maximize sensitivity to roll angle and minimize sensitivity to pitch and yaw. Since the angle θ is measured by matching the scanning pattern, the effect of the fixed gain g(D) is eliminated during each angle measurement as described in the following example pattern.

For a properly formulated scanning pattern for the polarized RF reference source, the roll angle θ is readily extracted from the received signal at the cavity sensor from the measured amplitude pattern of the vector R(t), the known mapping function $f(\bar{E}, \theta)$, and the scanning pattern of the vector $\bar{E}(t)$ as shown in the following example.

As an example, consider a scanning vector field $\bar{E}(t)=E_x(t)\hat{i}+E_y(t)\hat{j}$ formed by the orthogonal synchronized polarized electric field signals $E_x(t)$ and $E_y(t)$ shown in FIGS. 4 and 5, and which are modulated as follows $$E_x(t)=a(\cos \omega t+\cos 2\omega t)+b \quad (2)$$

$$E_y(t)=a(\sin \omega t+\sin 3\omega t)+b \quad (3)$$

where ω is the fundamental frequency of both signals, a is a constant signal amplitude and b is the constant that provides a proper amplitude modulation index.

The electric field detected by the cavity sensor 202 will then become $$\begin{aligned}R(t) &= g(D)(E_x(t)\cos\theta + E_y(t)\sin\theta) \quad (4)\\ &= g(D)\{[a(\cos\omega t + \cos 2\omega t) + b]\cos\theta + [a(\sin\omega t + \sin 3\omega t) + b]\sin\theta\}\\ &= g(D)[a(\cos\omega t \cos\theta + \sin\omega t \sin\theta) + a\cos\theta\cos 2\omega t +\\ &\quad a\sin\theta\sin 3\omega t + b(\sin\theta + \cos\theta)]\\ &= g(D)\begin{bmatrix} a\cos(\omega t - \theta) + a\cos\theta\cos 2\omega t +\\ a\sin\theta\sin 3\omega t + b(\sin\theta + \cos\theta)\end{bmatrix}\end{aligned}$$

It is readily seen from (4) that the roll angle θ can be determined from the phase shifting of the fundamental frequency ω and the zero crossing of the fundamental frequency that occurs when the harmonics 2ω and 3ω are in phase as shown in the example below. This can be done since as can be seen in equation (4), when ωt=π/2, cos 2ωt=−1 and sin 3ωt=−1, i.e., the harmonics 2ω and 3ω are in phase. The time corresponding to ωt=π/2 would obviously correspond to quarter of the period T of the fundamental frequency ω, i.e., T/4.

As expected, the gain g(D) does not affect the angle measurement, therefore angle measurement has become independent of position (distance) measurement. The angle θ can then be determined from the received signal, equation (4), as shown in the following example.

As an example, in the orthogonal synchronized polarized electric field signals $E_x(t)$ and $E_y(t)$ of equations (2) and (3), let a=1 and b=2. The resulting polarized electric field patterns $E_x(t)$ and $E_x(t)$ are shown in FIGS. 6a and 6b for a period of the fundamental frequency T (normalized to a unit 1).

The detected amplitude pattern of the detected signal R(t), equation (4), at the sensor receiver 202, FIG. 4, when the angle θ=60° is shown in the plot of FIG. 7a. The amplitudes of the detected fundamental frequency ω and its first two harmonics 2ω and 3ω obtained by Fourier integration of the detected signal is also shown in the plot of FIG. 7b.

In FIGS. 7a and 7b, the time of zero-crossing of the fundamental frequency harmonic is indicated as the point $R0_C$ and the zero time in equations (2)-(4), is also indicated as the point $T0_T$. Fourier integration of the received signal over the period T of the fundamental frequency ω shown in the plot of FIG. 7a provides the harmonic content of the received signal as shown in the plot of FIG. 7b. The harmonics 2ω and 3ω are in phase at the point Z1 corresponding to ωt=π/2, i.e., at the normalize scale of 0.25 in FIGS. 7a and 7b, i.e., a quarter of the period T of the fundamental frequency ω of the received signal. The zero-crossing point $R0_C$ of the fundamental frequency, which can be measured to be at 0.417 in the normalized scale of FIGS. 7a and 7b, is at cos(ωt−θ)=0, i.e., when (ωt−θ)=π/2. The angle θ, i.e., the phase of the fundamental frequency of the received signal, FIGS. 7a and 7b, which corresponds to the difference between the zero-crossing of the fundamental frequency $R0_C$ and the point Z1, can then be calculated to be 0.167, which corresponds to angle θ=60 degrees. The zero-time $T0_T$ at the transmitter 200, FIG. 4, of the transmitted signal, equations (2) and (3), being located a quarter of the period T of the fundamental frequency ω before the zero-crossing point $R0_C$ of the fundamental frequency ω is then determined in the clock time of the receiver 202.

One very important feature of the patterns of the type presented in this example is that they provide a reference position angle, which is fixed in the referencing coordinate system of the scanning referencing source at $T0_T$, FIGS. 7a and 7b.

The polarized RF scanning pattern of equations (2) and (3) is shown to have the unique characteristic of yielding the roll angle and time reference through readily detectable fundamental frequency and its first two harmonics. The detection electronics is also made simple and low cost and since the pattern is known to the detection signal processing unit, the roll angle can be recovered even when the signal-to-noise ratio of the measured RF signal is very low and even below unity.

In addition, the ratio of the amplitudes of the second and first harmonics, i.e., the ratio of the amplitudes of the harmonics with frequencies 3ω and 2ω, respectively, is seen to be tan(θ), which provides a second measurement for the roll angle. As a result, the angle measurement can be made more accurately, and the sensory system becomes more robust. In addition, by using more appropriate harmonics of the fundamental frequency in the transmitted polarized signals $E_x$ and $E_y$, the angle measurement can be made from multiple phase shifts and multiple ratios of the amplitudes of the higher harmonics of the fundamental frequency, thereby significantly increasing the angle measurement accuracy and the robustness of the sensory system.

It is appreciated that the features of the transmitted pattern by the orthogonal synchronized polarized electric field signals $E_x(t)$ and $E_y(t)$, shown in FIGS. 4-6a and 6b, an example of which is the modulated transmitted polarized RF signals described by equations (2) and (3), may also be provided with other specifically configured transmitted patterns. For example, the pattern described by the equations (2) and (3) may be used with added higher harmonics of the fundamental frequency ω, but by adding odd harmonics to the $E_x(t)$ component and even harmonics to the $E_y(t)$ component of the polarized electric field signal, such as the third harmonic to the $E_x(t)$ component the fourth harmonic to the $E_y(t)$ to get $$E_x(t)=a(\cos \omega t+\cos 2\omega t+\cos 4\omega t)+b \quad (5)$$

$$E_y(t)=a(\sin \omega t+\sin 3\omega t+\sin 5\omega t)+b \quad (6)$$

where ω is the fundamental frequency of both signals, a is a constant signal amplitude and b is the constant that provides a proper amplitude modulation index.

The electric field detected by the cavity sensor 202 will then become $$R(t) = g(D)(E_x(t)\cos\theta + E_y(t)\sin\theta) \quad (7)$$
$$= g(D)\{[a(\cos\omega t + \cos 2\omega t + \cos 4\omega t) + b]$$
$$\cos\theta + [a(\sin\omega t + \sin 3\omega t + \sin 5\omega t) + b]\sin\theta\}$$
$$= g(D)[a(\cos\omega t \cos\theta + \sin\omega t \sin\theta) +$$
$$a\cos\theta \cos 2\omega t + a\sin\theta \sin 3\omega t +$$
$$a\cos\theta \cos 4\omega t + a\sin\theta \sin 5\omega t + b(\sin\theta + \cos\theta)]$$
$$= g(D)[a\cos(\omega t - \theta) + a\cos\theta\cos 2\omega t + a\sin\theta\sin 3\omega t +$$
$$a\cos\theta\cos 4\omega t + a\sin\theta\sin 5\omega t + b(\sin\theta + \cos\theta)]$$

The scanning vector field $\bar{E}(t) = E_x(t)\hat{i} + E_y(t)\hat{j}$ formed by the orthogonal synchronized polarized electric field signals $E_x(t)$ and $E_y(t)$ would then provide a point at which the harmonics with frequencies of $3\omega$ and $2\omega$ are in phase, like point Z1 in FIGS. 7a and 7b, and also a point at which the harmonics with frequencies of $5\omega$ and $4\omega$ are in phase, both at $\omega t = \pi/2$. Thus, leading two measurements for the angle $\theta$, which make its measurement more accurate. In addition, two amplitude ratios, i.e., the ratio of the amplitudes of the $3\omega$ and $2\omega$ harmonics, and also the ratio of the amplitudes of the of $5\omega$ and $4\omega$ harmonics yield $\tan(\theta)$, thereby the angle $\theta$, thereby resulting in a more accurate measurement of the angle $\theta$.

It is also appreciated by those skilled in the art that other pairs of cosine and sine functions with frequencies $2n\omega$ and $(2n+1)\omega$, respectively, where n is an integer of 2 or higher, may also be added to the orthogonal synchronized polarized electric field signals $E_x(t)$ and $E_y(t)$, respectively, to similarly obtain two added measurement for the angle $\theta$, thereby making its measurement even more accurate.

It is appreciated that as previously indicated, since the signal patterns transmitted by the scanning polarized RF reference sources for making angular orientation measurement onboard a moving object/platform by their cavity sensors relative to a coordinate system established by the scanning polarized RF reference sources are known to the receiving cavity sensors, therefore the sensor system becomes highly insensitive to environmental noise, making the system immune to all countermeasures.

It is also appreciated that the described polarized RF signal with three or more polarized RF scanning reference sources and cavity sensors onboard the moving object/platform would establish a local referencing coordinate system in which the moving object/platform can determine its full angular orientation, e.g., roll, pitch, and yaw angles. By adding a fourth polarized RF scanning reference source, the moving object/platform can also determine its full position in the coordinate system established in by the fixed or mobile polarized RF scanning reference sources. The full position may be determined by employing well-known techniques used by GPS.

Now considering the aforementioned merits of the scanning polarized RF reference sources for making angular orientation measurement onboard a moving object/platform by their cavity sensors relative to a coordinate system established by the scanning polarized RF reference sources, it is highly desirable to develop methods and systems that would use the described angular orientation measuring technology, but with an integrated data communication capability.

It is also highly desirable that the developed method and system be capable of providing the integrated angular orientation information and communication data from the scanning polarized RF reference sources of the system to the moving object/platform at very low signal to noise ratios so that it would become very difficult to detect, jam or spoof.

It is also highly desirable that even if the signal pattern transmitted by the scanning polarized RF reference sources of the system is detected by an adversary, it would be very difficult for the adversary to decipher the communicated data and determine the onboard angular orientation measurements.

SUMMARY

A need, therefore, exists for methods and systems that can provide an angular orientation sensory system with integrated data communication capability the moving object/platform, which is provided using the scanning polarized RF reference sources of the system. The resulting system must operate at very low signal to noise ratios so that it would be very difficult to detect, jam or spoof.

A need also exists for methods and systems that are capable of transmitting integrated angular orientation and communication data with signal patterns by the scanning polarized RF reference sources of the system such that even if the signal is detected by an adversary, it would be very difficult for the adversary to decipher the communicated data and determine the onboard angular orientation measurements.

Accordingly, methods and related systems are provided that can be used to provide an integrated angular orientation sensory information with communication data to moving objects/platforms at very low signal to noise ratios so that it would be very difficult to be detected, jammed or spoofed.

Accordingly, methods and related systems are provided that can transmit integrated angular orientation information and communication data with signal patterns by the scanning polarized RF reference sources of the system such that even if the signal is detected by an adversary, it would be very difficult for the adversary to decipher the communicated data and determine the onboard angular orientation measurements.

In summary, the disclosed methods and related systems provide an integrated angular orientation sensory information with communication data to moving objects/platforms that has the following features as compared to any currently available technology:

The disclosed methods and systems are operable at signal-noise-ratios below unity, due to the use of time function scanning patterns produced by the modulated scanning polarization vectors.

The methods and systems can operate in short duration intermittent mode to reduce transmitter power requirements and avoid detection.

Spoofing of the disclosed systems is extremely difficult as the polarization scan patterns are agile and can be changed at will.

Jamming of the disclosed systems require a considerable amount of power as the system is a polarized system, the polarization vectors (amplitude and angle) are functions of time with a prescribed harmonic patterns and periodic, and the signal can be recovered over shorts bursts and ensemble averaged to enhance the SNR.

The systems are operable in non-line-of-sight as well as line-of-sight conditions.

The systems are operable in all weather and terrain.

A need also exists for methods and systems that would enable an object/platform, such as a munition, to sense its orientation and direction of travel, and covertly receive communication data, including dynamic target information from multiple scanning polarized RF reference sources of the system, which may include fixed and mobile scanning polarized RF reference sources provided on UAVs, UGV, and other fixed and mobile platforms, such as those used for configuring fixed or dynamic targets, such as to fire control and battle management in the case of a munition.

A need therefore exists for methods and apparatus for a moving object/platform to determine its actual direction of travel, at least occasionally, as should have been determined by the GPS signal and thereby determine if the GPS signal is being spoofed and then to take an appropriate corrective action.

Accordingly, methods and systems are provided that would enable an object, such as a munition, to sense its orientation, and covertly receive communication data, including dynamic target information from multiple scanning polarized RF reference sources of the system, which may include fixed and mobile scanning polarized RF reference sources provided on UAVs, UGV, and other fixed and mobile platforms, such as those used for configuring fixed or dynamic targets, such as to fire control, guidance towards a target, and battle management in the case of a munition.

Accordingly, methods and systems are provided that enable a moving object/platform to determine its actual direction of travel, at least occasionally, as should have been determined by the GPS signal and thereby determine if the GPS signal is being spoofed and then to take an appropriate corrective action.

A need also exists for methods and systems to synthesize efficient polarized RF reference source scanning patterns that can provide the information required for angular orientation calculations between the scanning polarized RF reference sources and an object/platform with integrated data communication capability.

Accordingly, methods and systems for synthesizing polarized RF scanning patterns that can be efficiently used for angular orientation calculations between the scanning polarized RF reference sources and an objects/platform with integrated data communication capability are provided.

It is appreciated by those skilled in the art that since all the aforementioned angular orientation measurements are relative angular orientation measurements, i.e., angular orientation between an object/platform and one or more scanning polarized RF reference sources, therefore the object/platform and/or one or more of the scanning polarized RF reference sources may be stationary or moving relative to the earth.

It is also appreciated by those skilled in the art that one or more of the objects/platforms or the scanning polarized RF reference source platforms may be configured to obtain the location of a target, for example, an UAV that also serves as one of the scanning polarized reference sources may be provided of determining the location of a target, and then the UAV (i.e., the UAV scanning polarized reference source platform) may then provide the position of the target to other scanning polarized reference sources and/or other objects/platforms.

It is appreciated by those skilled in the art that methods and systems to function as "homing" sensors for guiding flying objects/platforms remotely to a desired location or to intercept a moving target, where the desired location or to moving target to be intercepted is configured from a fixed or mobile station can also be used for guiding mobile objects, such as Unmanned Ground Vehicles (UGV) or the like on the ground or unmanned moving objects/platforms on water or serve as a "homing" sensor to direct the driver of a manned ground vehicles or the like towards the said desired location or to intercept a moving target.

Hereinafter, the methods and sensory devices and systems will be described for a flying object/platform with no intention of excluding their application to fixed or mobile objects on the ground such as UGVs and other mobile platforms or even people or animals.

A need therefore also exists for methods and systems to function as "homing" sensors for guiding moving/flying objects/platforms remotely in the desired direction towards a stationary or moving target, where the desired direction for target intercept may be designated from one or more fixed or mobile polarized RF scanning reference sources.

In many applications, there is also a need that the said methods and systems to function as "homing" sensors for guiding moving/flying objects/platforms remotely in the desired direction towards a stationary or moving target be relatively low power and occupy relatively small volumes. This is particularly desirable in munitions, UAVs and the like applications.

Accordingly, methods and systems are provided that enable a moving object/platform to determine its desired direction of travel to intercept a fixed and moving target.

A need also exists for methods and systems that can use fixed or mobile polarized RF scanning reference sources to transmit signal patterns for angular orientation measurement onboard a fixed or moving object/platform with integrated communication data at very low signal to noise ratio, which even if it is detected by an adversary, it would be very difficult by the adversary to identify the signal pattern with which the transmitted information is being transmitted.

Accordingly, methods and systems are provided that enable fixed and mobile polarized RF scanning reference sources to transmit signal patterns for angular orientation measurement onboard a fixed or moving object/platform with integrated communication data at very low signal to noise ratio, which even if it is detected by an adversary, it would be very difficult by the adversary to identify the signal pattern with which the transmitted information is being transmitted.

BRIEF DESCRIPTION OF THE DRAWINGS

These and other features, aspects, and advantages of the apparatus of the described embodiments will become better understood with regard to the following description, appended claims, and accompanying drawings where:

FIG. 7a is the plot of the detected signal pattern at the object receiver sensor for the transmitted polarized fields $E_x$ and $E_y$ of FIGS. 6a and 6b and FIG. 7b is the plot of its ω, 2ω and 3ω harmonic amplitudes.

FIG. 11a illustrates a composite received signal, FIG. 11b illustrates a phase synchronization of the first and second harmonics of the fundamental frequency harmonic at ZR, and FIG. 11c illustrates a data pattern of the higher order harmonics corresponding to the data character.

FIGS. 12a and 12b illustrate the plots of the received integrated angular orientation and communication data signal pattern at the object/platform cavity sensor. FIG. 12a is the plot of the noisy demodulated sensor response and FIG. 12b shows the comparison of original and recovered data pattern at SNR=−9.4 dB.

DETAILED DESCRIPTION

The disclosed methods and systems use the above-described signal patterns transmitted by the fixed or moving scanning polarized RF reference sources for angular orientation measurement onboard a moving object/platform, while also providing establishing a secure communication link between the fixed or moving scanning polarized RF reference sources and the moving object/platform that can be used for guidance and control, indicating the direction of travel towards the desired dynamic target, and providing all other desired commands.

A further advantage using the scanning pattern of the polarized RF transmitted signals, which are based on signal patterns known to the receiving object/platform comes from the fact that known signal patterns can be recovered with low signal to noise ratio, even significantly below unity, as described below. This translates into lower power transmitters which can operate in a stealth mode and permits size scaling.

Figure 8:
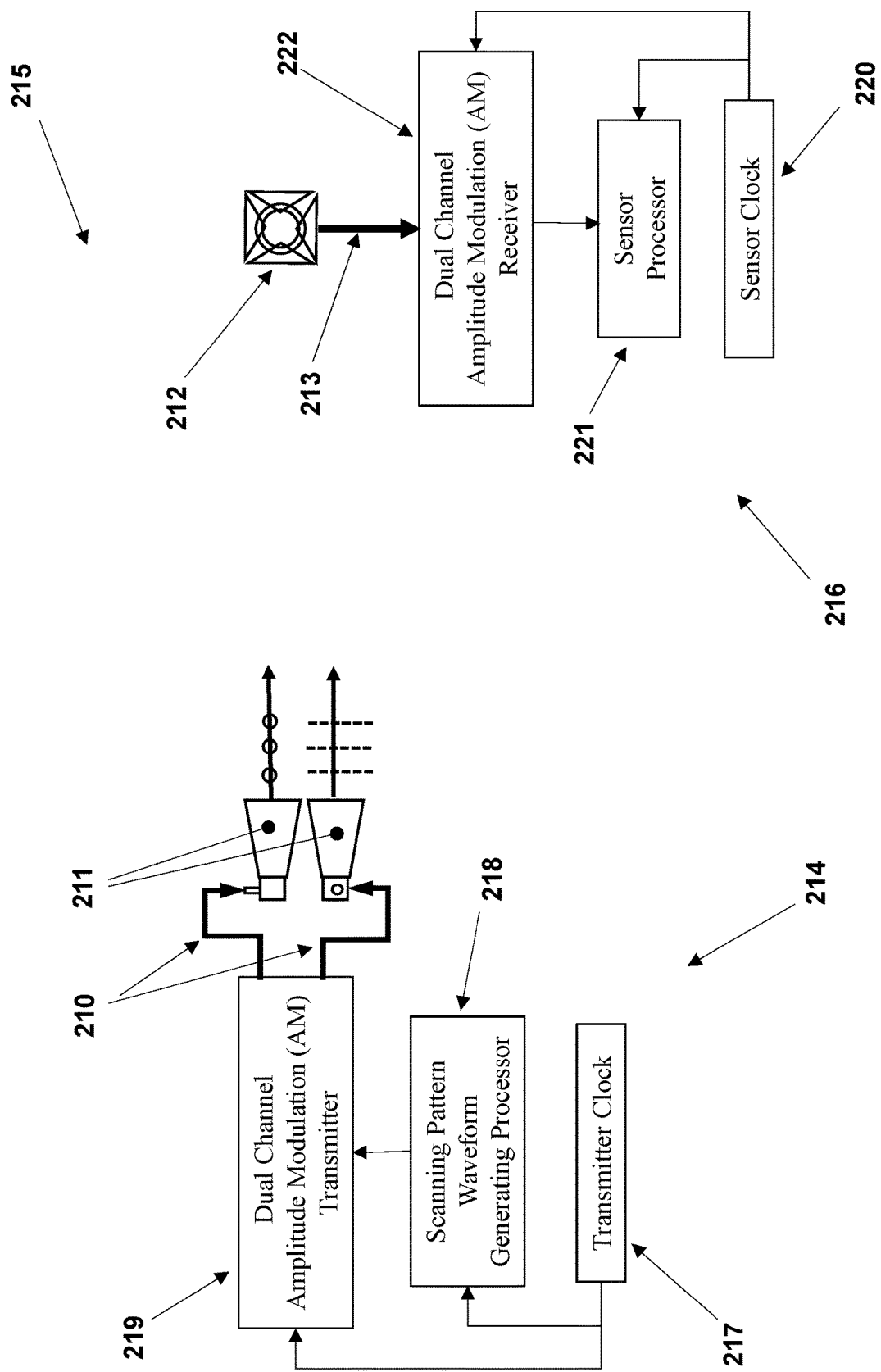
FIG. 8 illustrates the block diagram of the polarized RF scanning pattern based sensory system of FIG. 4 for the object measuring its roll relative to a scanning polarized RF transmitter source.

FIG. 8 presents a block diagram of the scanning polarized RF reference sources-based system embodiment 215 for measuring angular orientation onboard fixed or moving objects/platforms with integrated data communication capability from the scanning polarized RF reference sources and the fixed or moving objects/platforms, hereinafter referred to as the "angular orientation with integrated data communication system".

The scanning polarized RF reference sources-based system embodiment 215 of FIG. 8 consists of two basic components, a polarized RF scanning reference source 214 component, and at least one cavity sensor receiver 216 that is attached to the aforementioned fixed or moving object/platform that its roll angle is desired to be determined onboard the object/platform relative to the polarized RF scanning reference source 214 as was previously described. In general, at least one cavity sensor is used onboard the object that has high sensitivity to the receiving scanning polarized signal as described previously.

It is appreciated by those skilled in the art that the reason for indicating that more than one cavity sensor receiver 216 may be present is that in general multiple objects/platforms may be provided with such cavity sensor receivers 216, and all such objects can simultaneously measure their roll angles relative to the polarized RF scanning reference source 214.

As can be seen in the block diagram of FIG. 8, the polarized RF scanning reference source 214 component of the scanning polarized RF reference sources-based system embodiment 215 consists of a "Transmitter Clock" 217, which is used by the "Scanning Pattern Waveform Generating Processor" (hereinafter also referred to as the "Transmitter Processor") 218, which is tasked to generate the two scanning pattern waveform, for example, the waveforms of equations (2) and (3) or (5) and (6), for the orthogonal synchronized polarized electric field signals $E_x(t)$ and $E_y(t)$, respectively. The two generated signals $E_x(t)$ and $E_y(t)$ are sent to the pair of antennas 211 via the transmission lines 210, which are oriented to properly transmit the orthogonal synchronized polarized signals. The transmitter processor 218 can be configured solely from hardware (e.g., a circuit) and any combination of hardware and software. Furthermore, the transmitter processor 218 may include memory for storing any associated software and other data and may be configured to also provide the function of the transmitter clock 217.

As can be seen in the block diagram of FIG. 8, the cavity sensor receiver 216 component of the scanning polarized RF reference sources-based system embodiment 215 consists of a "Sensor Clock" 220, which is used by the sensor processor 218, which is tasked to perform the aforementioned Fourier transform operation on the detected signal, for example those described by equation (4) or (7), such as those shown in the plots of FIG. 7. The transmitted signal by the polarized RF scanning reference source 214 component of the scanning polarized RF reference sources-based system embodiment 215 is detected by the cavity sensor (antenna) 212 of the cavity sensor receiver 216 component of the scanning polarized RF reference sources-based system embodiment 215 and is sent to the dual channel Amplitude Modulation (AM) receiver 222 via the transmission line 213. The sensor processor 221 can be configured solely from hardware (e.g., a circuit) and any combination of hardware and software. Furthermore, the sensor processor 221 may include memory for storing any associated software and other data and may be configured to also provide the function of the sensor clock 220.

It is appreciated that the "Transmitter Clock" 217 of the polarized RF scanning reference source 214 component of the scanning polarized RF reference sources-based system embodiment 215 and the "Sensor Clock" 220 of the cavity sensor receiver 216 component of the scanning polarized RF reference sources-based system embodiment 215 are real time clocks and continuously keep track of the elapsed time and have their own time reference, and their time reference is usually different from each other. However, their measurement of an elapsed time period has high precision for the above and the following elapsed time measurement requirements.

The scanning polarized RF reference sources-based system embodiment 215 would then operate as follows. At any desired point of time, a scanning pattern, equations (2) and (3) or (5) and (6) or other appropriate patterns as was previously described, is generated for the orthogonal synchronized polarized electric field signals $E_x(t)$ and $E_y(t)$, respectively, by the "Scanning Pattern Waveform Generating Processor" 218.

Figures 6A, 6B:
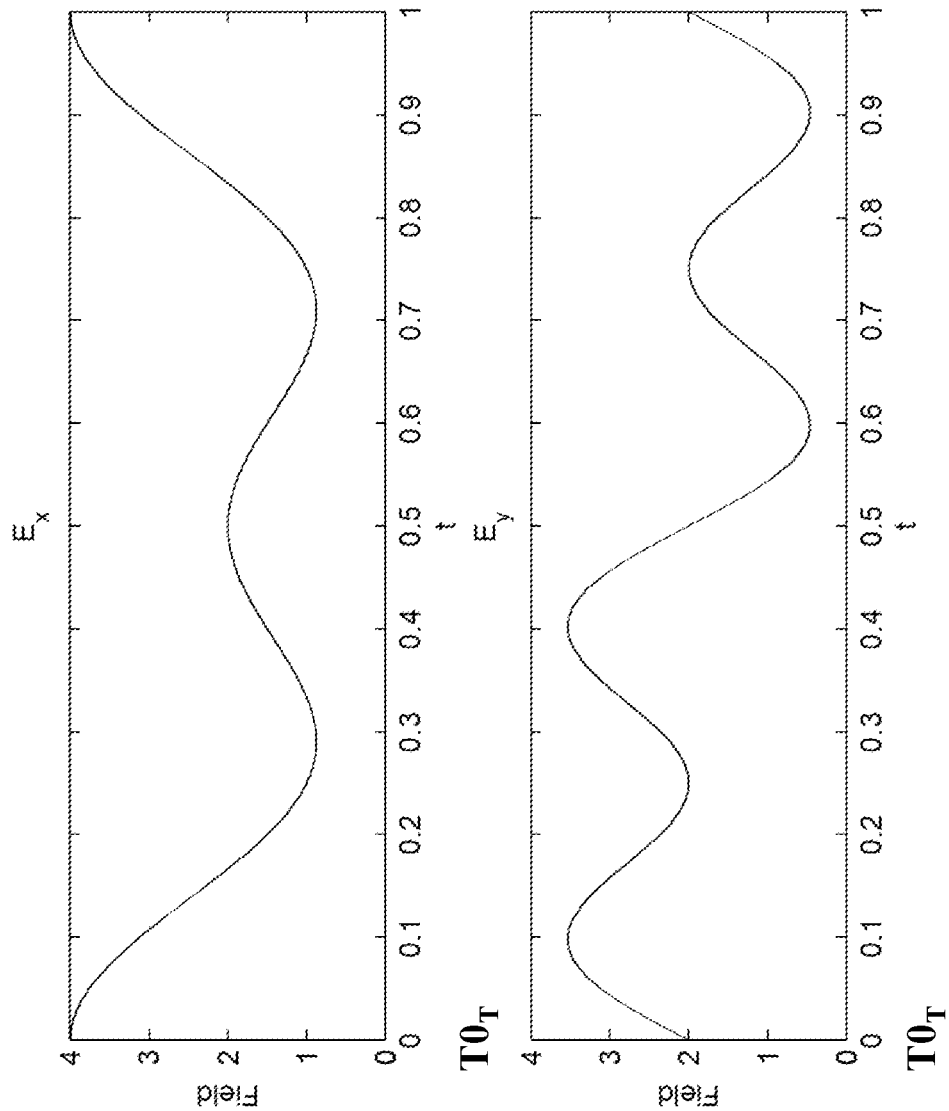
FIG. 6a is the plot of an example of the transmitted polarized fields $E_x$ and $E_y$ for the pattern for roll angle measurement and FIG. 6b is the plot of its harmonic component.

It is appreciated that the generated waveform when generated with the waveforms described by equations (2) and (3) would be as plotted in FIGS. 6a and 6b, which illustrates one period (cycle) of the generated pattern.

It is also appreciated by those skilled in the art that in general, more than one cycle (period) of the waveform is generated and transmitted, each cycle of which is hereinafter considered to start from a time t=0, which corresponds to the time that is hereinafter referred to as the "Transmitter Clock" 217 "zero time" of the polarized RF scanning reference source 214 component of the scanning polarized RF reference sources-based system embodiment 215, for example, the time $T0_T$ in FIG. 7b, which is also hereinafter referred to as the "zero time" of the "transmitted signal pattern". The time reference in the "Transmitter Clock" 217 is also hereinafter referred to as the "transmitter time".

Figure 1:
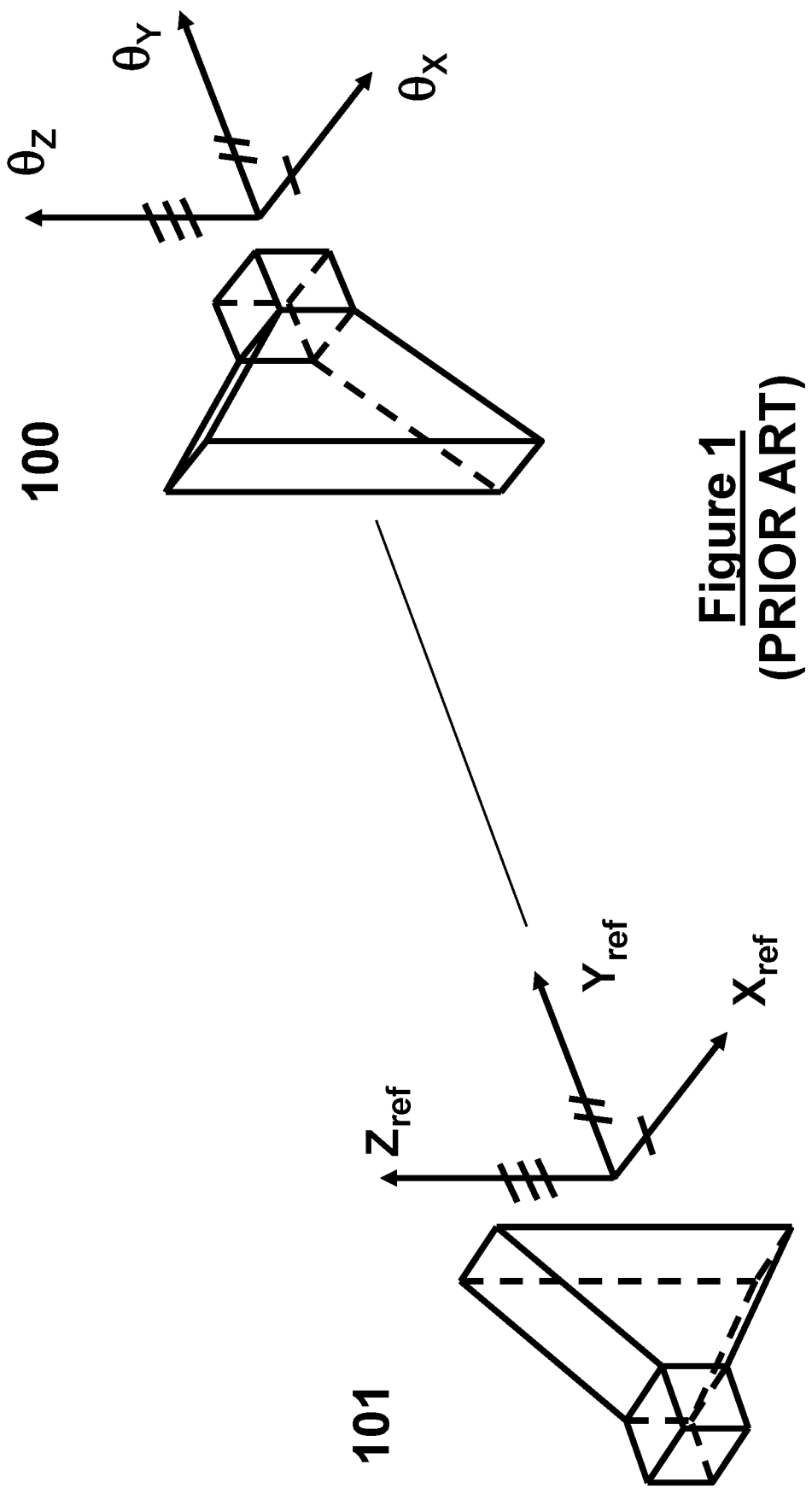
FIG. 1 illustrates a schematic representation of a cavity sensor with respect to a polarized radio frequency (RF) reference source of the prior art.
Figure 2:
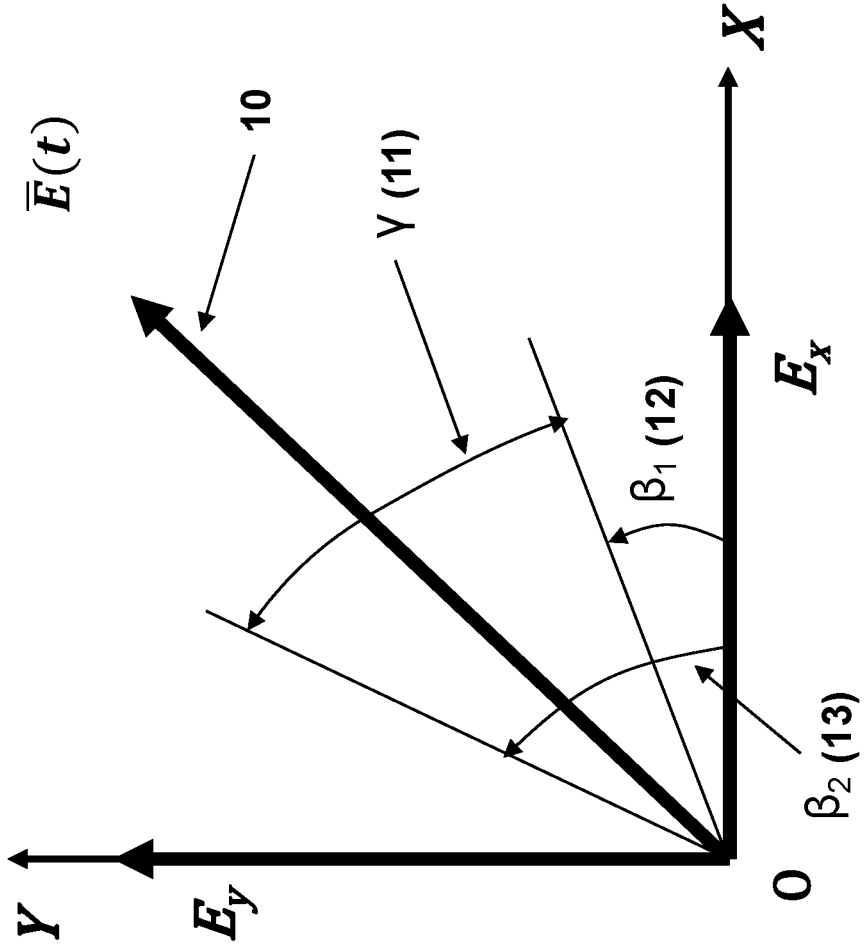
FIG. 2 illustrates a scanning polarized vector field $\bar{E}(t)$ of a polarized RF scanning reference source that is generated by two synchronized and orthogonally directed modulating polarized RF transmitters that are positioned at the origin of the Cartesian XY coordinate system O.
Figure 3:
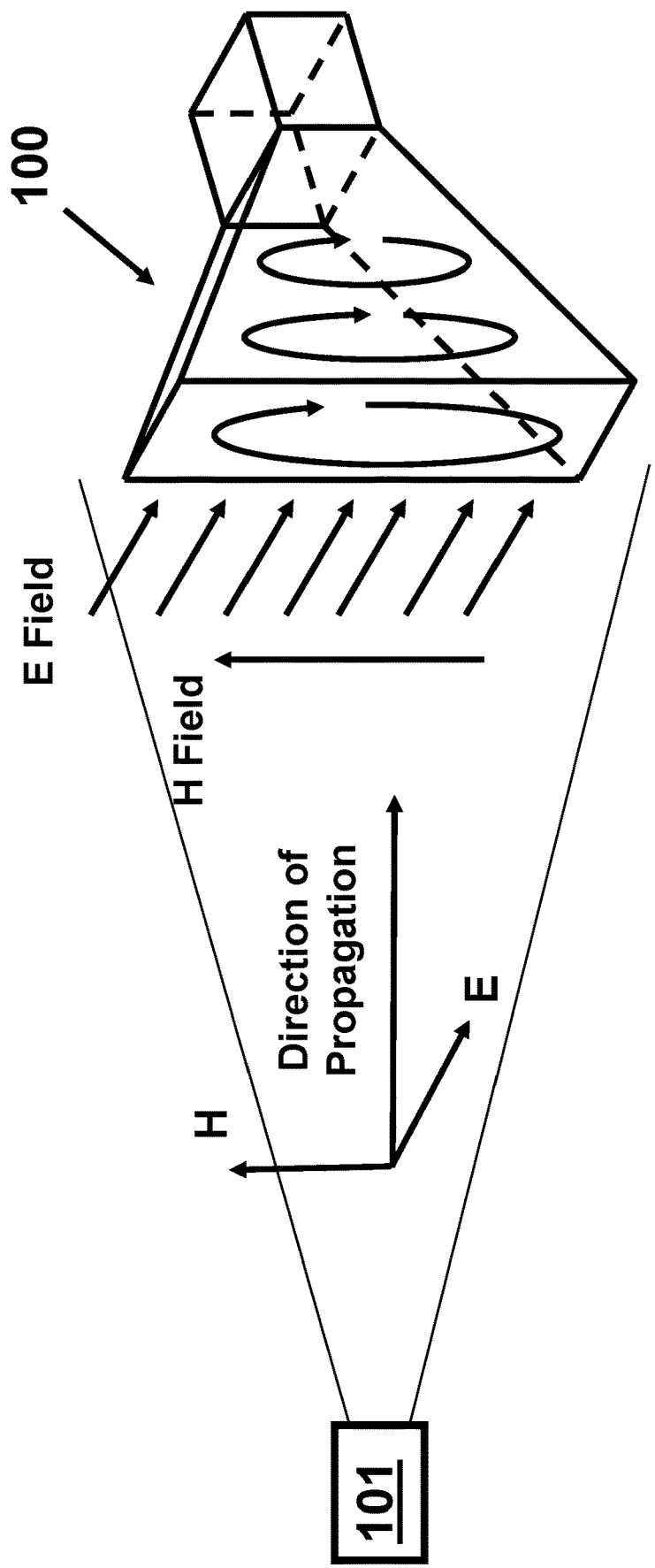
FIG. 3 illustrates a schematic representation of a cavity sensor with respect to a polarized radio frequency (RF) reference source of the prior art.
Figure 4:
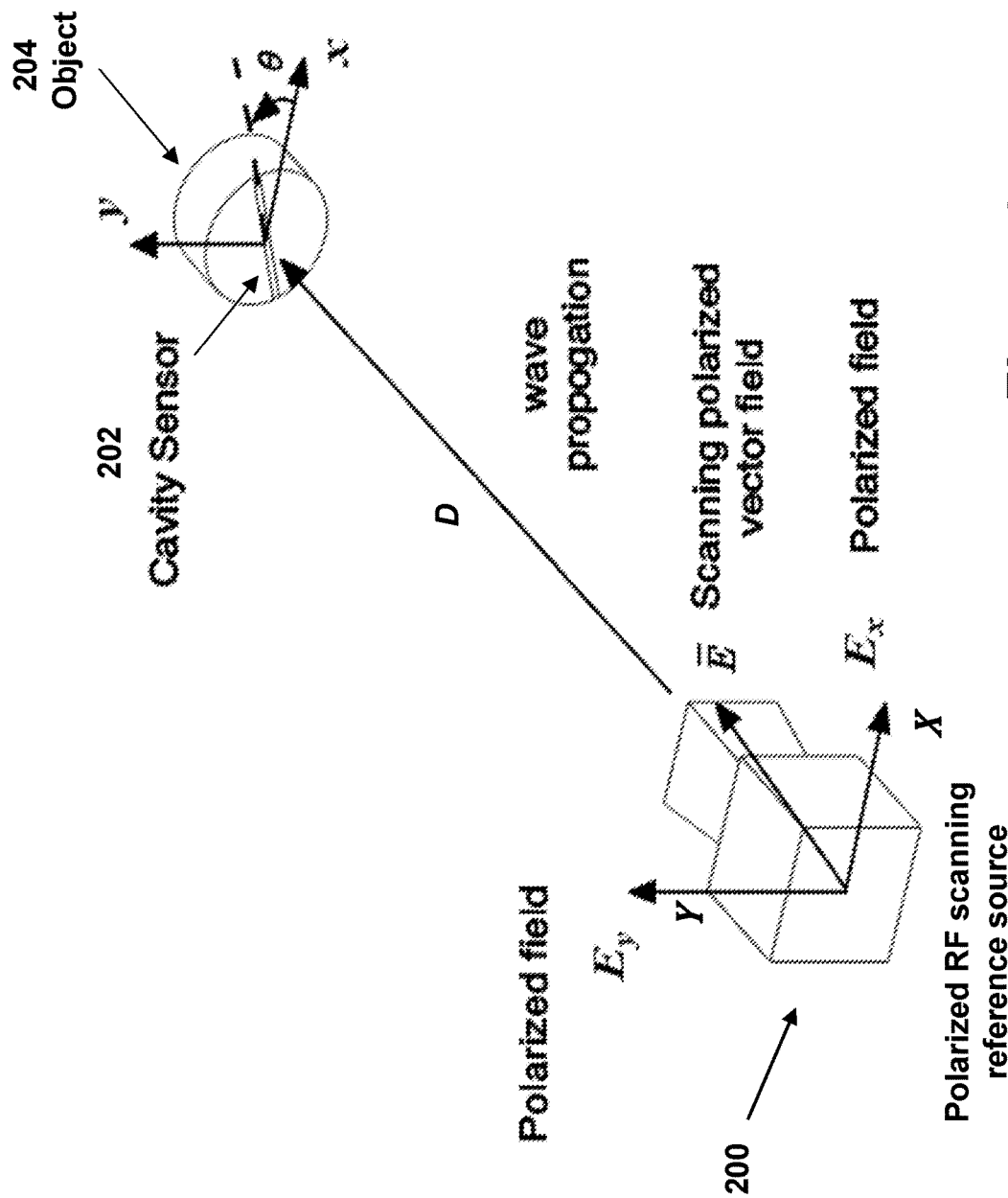
FIG. 4 illustrates the configuration of a polarized RF scanning reference source and a cavity sensor for measuring roll angle.
Figure 5:
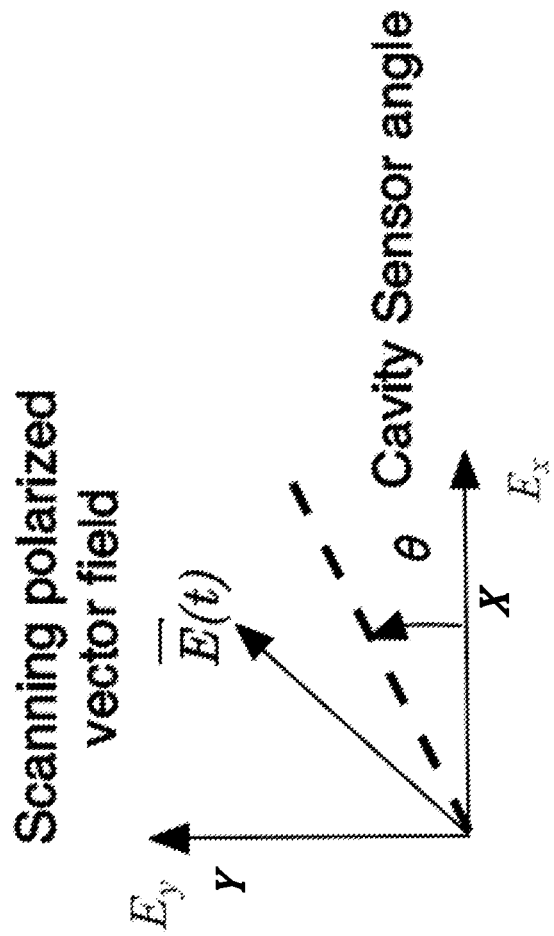
FIG. 5 illustrates the scanning polarized vector field $\bar{E}(t)$ obtained by modulating the amplitudes of the synchronized and polarized fields $E_x$ and $E_y$ and the indicated roll angle as shown in the configuration of FIG. 4.

The generated orthogonal synchronized polarized electric field signals $E_x(t)$ and $E_y(t)$ are then transmitted to the pair of antennas 211, which are oriented to properly transmit the orthogonal synchronized polarized signals in the planes of XZ and YZ, FIG. 4, via transmission lines 210.

The two synchronized polarized electric field signals $E_x(t)$ and $E_y(t)$ are then detected by the cavity sensor (antenna) 212 of the cavity sensor receiver 216 component of the scanning polarized RF reference sources-based system embodiment 215. The detected signal is then transmitted to the "Dual Channel Amplitude Modulation (AM) Receiver" 222 via the transmission line 213, where it is generally amplified and digitized and sent to the "Sensor Processor" 221.

The "Sensor Processor" 221 would then use a well-known Fourier integration algorithm to extract the fundamental frequency and its harmonics constituting the detected signal pattern, for example the fundamental frequency and its first two harmonics for the transmitted pattern described by equations (2) and (3), FIGS. 7a and 7b, in the "Sensor Clock" time reference, which hereinafter is referred to as the "sensor time" and if it refers to the object/platform on which the cavity sensor receiver 216 component is mounted, then it is referred to as the "object time".

The "sensor processor" would then identify the time (in the reference time of the "Sensor Clock") at which the first and second harmonics of the fundamental frequency ω harmonic, i.e., the harmonics with frequencies 2 and 3 are in phase (Z1 in FIG. 7b, at 0.25 T), the time (in the reference time of the "Sensor Clock") of zero crossing $R0_C$, FIG. 7b, of the fundamental frequency harmonic, and thereby the zero time $T0_T$, i.e., the aforementioned zero-time for the transmitted signal pattern in the "Transmitter Clock" 217 reference time, in the reference time of the "Sensor Clock". It is noted that as it was previously described, the time $T0_T$ in the "Sensor Clock" reference time is located 0.25 T (i.e., π/2 of the full cycle of the fundamental frequency harmonic) before the zero-crossing $R0_C$ of the fundamental frequency harmonic, as shown in FIG. 7b. The angle θ, which is the phase shift of the detected signal, equation (4), is then determined as the corresponding angle between the points $R0_C$ and Z1, FIG. 7b, on the detected signal.

As it was previously indicated, one advantage of using the scanning pattern of the polarized RF signals, such as those based on specific combinations of harmonic modulation functions, e.g., those described by equations (2) and (3) or (5) and (6) or other appropriate patterns as was previously described, is that since the signal pattern is known to the receiver of the signal, in the case of the scanning polarized RF reference sources-based system embodiment 215 of FIG. 8 the cavity sensor receiver 216 component of the system, the known patterns can be recovered from signals with low signal to noise ratio, even significantly below unity, as is shown in the following example. This translates into lower power transmitters which can operate in a stealth mode.

Figure 9B:
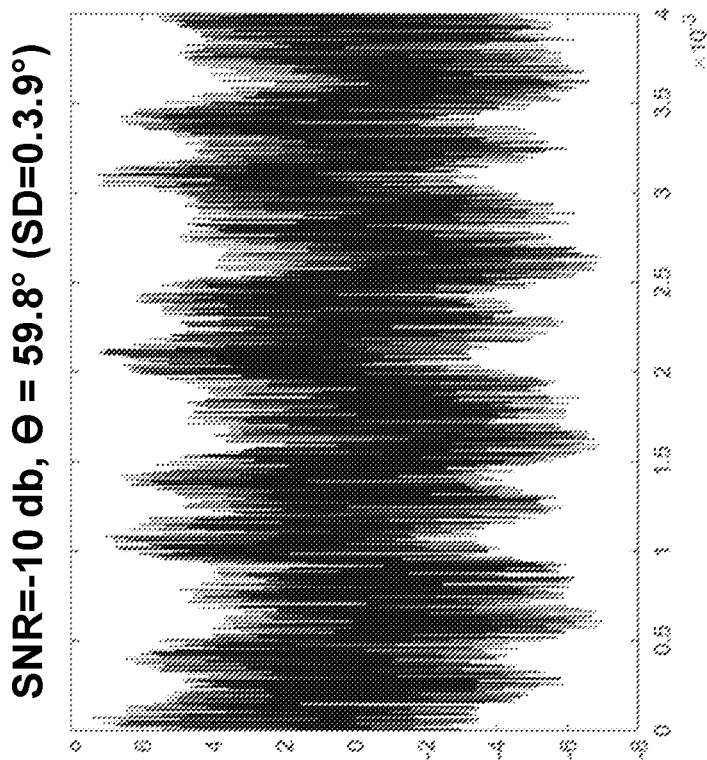
FIG. 9a illustrates the plots of a sample of received signal patterns for a roll angle orientation θ=60° at signal-to-noise ratios (SNR) of SNR=10 dB and FIG. 9b illustrates the plots of SNR=−10 dB at θ=60 and their standard deviation over 10 sample periods of transmitted patterns.
Figure 9A:
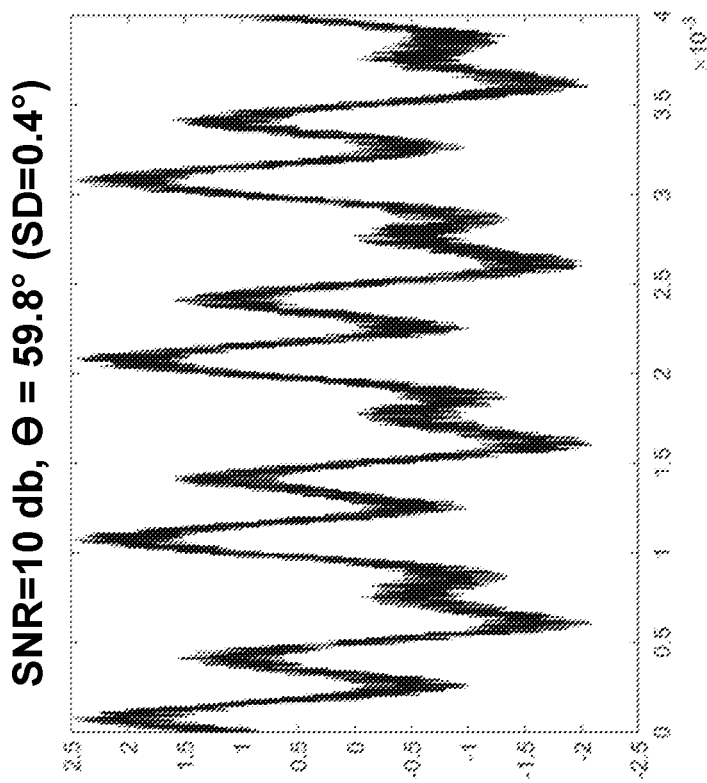

FIGS. 9a and 9b illustrate an example of the recovery of the transmitted signal patterns with different signal-to-noise ratios (SNR). In this example, using the method previously described, a roll angle orientation angle of θ=60° is shown to be recovered from the transmitted signal pattern that is generated using the polarized RF scanning pattern of equations (2) and (3) with SNR=10 dB (FIG. 9a) and at SNR=-10 dB (FIG. 9b). The plots of FIGS. 9a and 9b show the signals that are detected by the cavity sensor (antenna) 212 of the cavity sensor receiver 216 component of the sensory system 215, FIG. 8, transmitted to the "Dual Channel Amplitude Modulation (AM) Receiver" 222 via the transmission line 213, where it is amplified and digitized and sent to the "Sensor Processor" 221. The "Sensor Processor" 221 would have then used the previously describe process to determine the roll angle θ. A sample of received signal for at a SNR=10 dB and at a SNR=-10 dB, in FIGS. 9a and 9b, respectively, are shown. The measured roll angle θ as measured using 10 periods of the signal pattern measurements are shown above each plot, together with their standard deviation in the parenthesis.

The method of using the scanning polarized RF reference sources-based system embodiment 215 of FIG. 8 for roll angle measurement was described above in detail. The method was also shown that can provide the transmitted signal at a very low signal-to-noise ratio, even well below one, thereby effectively hiding the signal in the environmental noise. The fact that the transmitted RF signal is also polarized in addition to being intermittently transmitted in short duration pulses, makes it even more difficult to detect, and jammed or spoofed. In addition, as it is described below, the method of using the scanning polarized RF reference sources-based system embodiment 215 of FIG. 8 may be extended to provide integrated angular orientation measurement and data communication capability. The integrated angular orientation and communication data signal patterns can similarly be provided at very low signal-to-noise ratios of even well below one and can thereby be hidden in the environmental noise. Similarly, since the transmitted RF signal patterns are also polarized in addition to being intermittently transmitted in short duration pulses, it makes them even more difficult to detect, and jammed or spoofed.

In this modified method of using the scanning polarized RF reference sources-based system embodiment 215 of FIG. 8, the basic orthogonal synchronized polarized electric field signals $E_x(t)$ and $E_y(t)$, respectively, of equations (2) and (3) are provided with additional appropriate terms that are then used to transmit communication date along with the roll angle orientation data. One such sets of appropriate terms would be the addition of pairs of cosine and sine functions with frequencies $2n\omega$ and $(2n+1)\omega$, respectively, where n is an integer of 2 or greater, as described in equations (8) and (9) below:

$$E_x(t) = a(\cos\omega t + \cos 2\omega t) + \sum_{n=2}^{N} b_n \cos(2n\omega t) + c \quad (8)$$

$$E_y(t) = a(\sin\omega t + \sin 3\omega t) + \sum_{n=2}^{N} d_n \sin[(2n+1)\omega t] + c \quad (9)$$

where $\omega$ is the fundamental frequency of both signals, a, $b_n$ and $d_n$ are constant signal amplitudes and b is the constant that provides a proper amplitude modulation index.

It is appreciated by those skilled in the art that in the orthogonal synchronized polarized electric field signals $E_x(t)$ and $E_y(t)$, respectively, of equations (8) and (9), the fundamental frequency $\omega$, determines the length of the repeating scan pattern. Its basic orthogonal synchronized polarized electric field signals $E_x(t)$ and $E_y(t)$, respectively, of equations (2) and (3), would provide the roll angle orientation and "zero-time" information as was previously described, and the summation terms in equations (8) and (9) can be used to code (map) one or more data character of the information to be securely transmitted from the polarized RF scanning reference source 214 component of the scanning polarized RF reference sources-based system embodiment 215 to the fixed or moving object/platform that is provided with the cavity sensor receiver 216 component of the scanning polarized RF reference sources-based system embodiment 215, FIG. 8.

It is appreciated by those skilled in the art that that orthogonal synchronized polarized electric field signals $E_x(t)$ and $E_y(t)$, respectively, of equations (8) and (9) indicate only one set of appropriate signal patterns that may be used for the purpose integrating angular orientation and communication data information. The uniqueness of the orthogonal synchronized polarized electric field signals of equations (8) and (9) is that the added summation terms can also be used to provided added angular orientation measurements as was shown for the case of N=2, which yields the orthogonal synchronized polarized electric field signals $E_x(t)$ and $E_y(t)$, respectively, of equations (5) and (6).

The orthogonal synchronized polarized electric field signals $E_x(t)$ and $E_y(t)$, respectively, of equations (8) and (9) provides polarization scan patterns that are used onboard the fixed or moving object/platform to determine its angular orientation and position as was previously described, while it also includes embedded communication data. While each transmitted pattern retains the inherent features for the zero-time reference and the ability to extract the orientation angle from each pattern, these features are not needed to establish a secure communication channel.

Figure 10B:
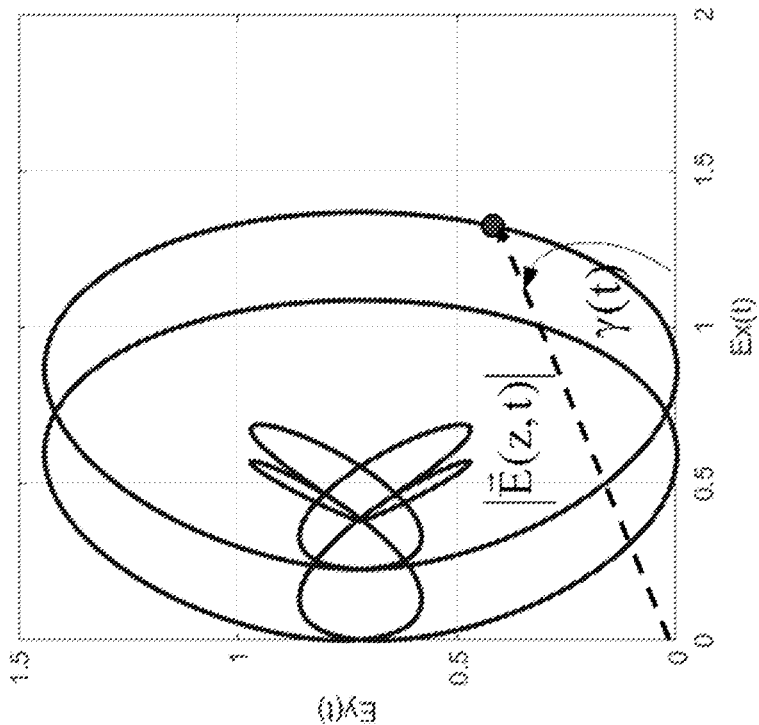
FIG. 10a illustrates the plots of polarization scan patterns in the absence of data and FIG. 10b illustrates the plots with the data. The plots of FIGS. 10a and 10b show the locus of the tip of the electric field vector over one period of the fundamental.
Figure 10A:
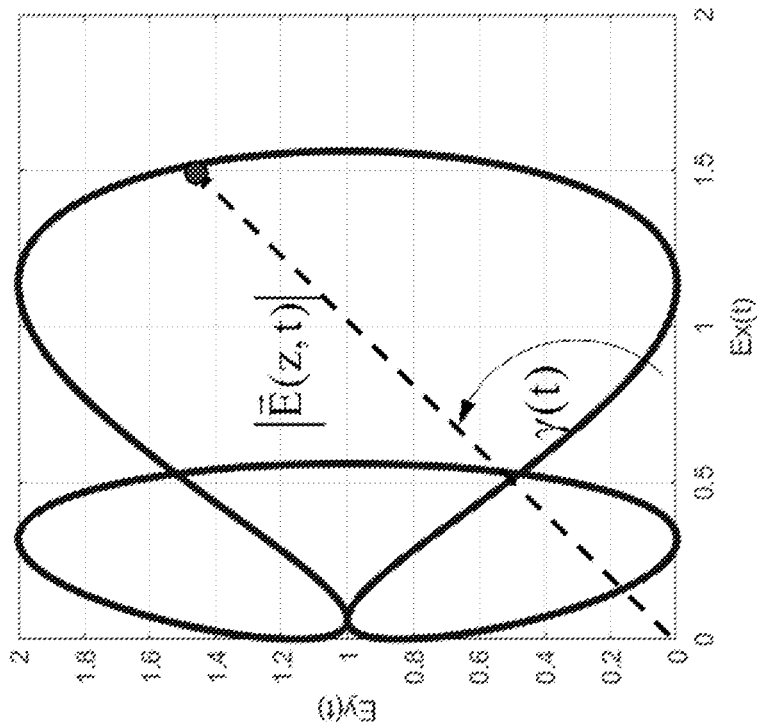

FIGS. 10a and 10b show polarization scan patterns with (FIG. 10b) and without (FIG. 10a) inclusion of the data. In this example, the data character was defined by the inclusion of the $4^{th}$, $5^{th}$, $6^{th}$ and $7^{th}$ harmonics in equations (8) and (9). The plots show the locus of the tip of the electric field vector over one period of the fundamental. With four such harmonics, 16 distinct data characters can be defined and transmitted with each scan. Adding, the $8^{th}$ and $9^{th}$ harmonics extends the data character set to 64. It is appreciated by those skilled in the art that instead of communication via transmission of characters, numerous other communication methods and protocols known in the art may also be used.

Then signal received R(t) at the cavity sensor receiver 216 component of the scanning polarized RF reference sources-based system embodiment 215, FIG. 8, is as shown in equation (1) and is given as $$R(t)/g(D) = \left[a(\cos\omega t + \cos 2\omega t) + \sum_{n=2}^{N} b_n \cos(2n\omega t) + c\right] \quad (10)$$
$$\cos\theta + \left[a(\sin\omega t + \sin 3\omega t) + \sum_{n=2}^{N} d_n \sin[(2n+1)\omega t] + c\right]\sin\theta$$

where g(D) is the gain related to the distance D between the scanning reference source and the cavity sensor and the existing environmental factors. Since the time taken to make an angle measurement is very small, changes in the gain g(D) during each angle measurement are negligible and the gain g(D) can usually be considered to stay constant, otherwise it can be readily accounted for as it is described later.

Then similar to the equations (4) and (7), the equation (10) may be manipulated to yield $$\frac{R(t)}{g(D)} = a\cos(\omega t - \theta) + a\cos\theta \cos 2\omega t + a\sin\theta \sin 3\omega t + \quad (11)$$
$$c(\cos\theta + \sin\theta) + \cos\theta \sum_{n=2}^{N} b_n \cos(2n\omega t) + \sin\theta \sum_{n=2}^{N} d_n \sin[(2n+1)\omega t]$$

The structure of the scanning pattern can be separated into the following three frequency regions: 1) a fundamental frequency component, which defines the period of the scanning pattern and is the component that undergoes a shift in the time domain according to orientation angle $\theta$ as was previously described for equations (4) and (7); 2) frequencies corresponding to the first and second harmonics of the fundamental, which define the zero-time reference within the fundamental period, i.e., the location of the phase synchronization of the first and second harmonics of the fundamental frequency; and 3) frequencies greater than the 4th harmonic of the fundamental frequency, which are used to code data to be sent securely from the polarized RF scanning reference source 214 component of the scanning polarized RF reference sources-based system embodiment 215 to the fixed or moving object/platform that is provided with the cavity sensor receiver 216 component of the scanning polarized RF reference sources-based system embodiment 215, FIG. 8.

The summation terms in equation (11) represent one of the data characters in the complete message to be transmitted. A complete data frame is transmitted by sequential transmission of the scanning patterns.

It is appreciated by those skilled in the art that pairs of cosine and sine functions with frequencies $2n\omega$ and $(2n+1)\omega$, respectively, where n is an integer of 2 or greater, that are present in the orthogonal synchronized polarized electric field signals $E_x(t)$ and $E_y(t)$, respectively, of equations (8) and (9) may also be used to obtain added measurements for the angle $\theta$ and zero-time calculations, thereby making their measurements even more accurate.

Figure 11A:
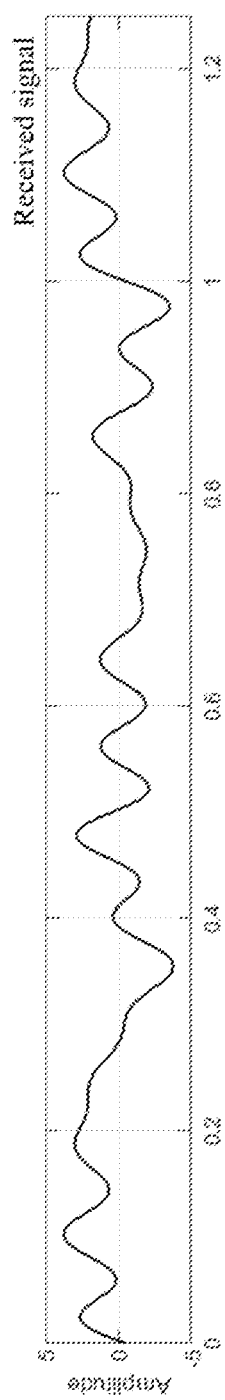
FIGS. 11a-11c illustrate the structure of the received signal containing angular orientation with integrated communication data.
Figure 11B:
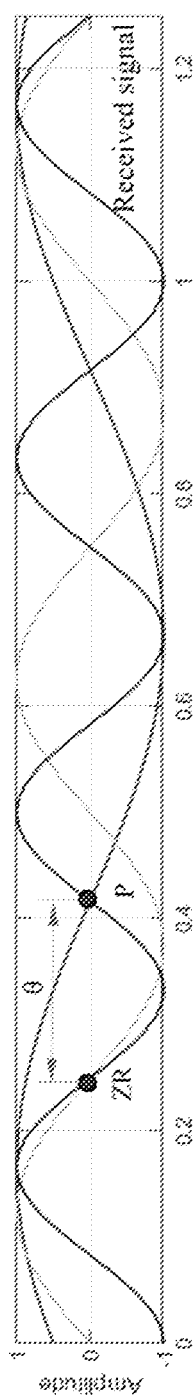
Figure 11C:
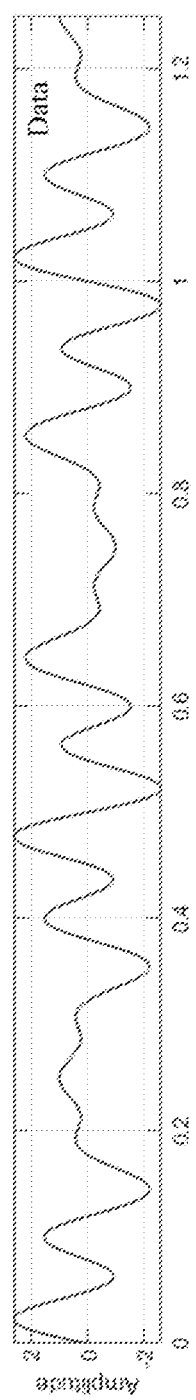

FIGS. 11a-11c show a received signal pattern R(t), equation (11), for an exemplary case where data is coded using $3^{rd}$, $4^{th}$, $5^{th}$ and $6^{th}$ harmonics of the fundamental frequency harmonic. FIG. 11a is the received signal pattern R(t); FIG. 11b shows the shifted fundamental frequency harmonic relative to the phase synchronization of the first and second harmonics of the fundamental frequency harmonic at the location ZR, which is the zero-time reference of the polarized RF scanning reference source 214 component of the scanning polarized RF reference sources-based system embodiment 215 as was previously described. The angular distance from the ZR to the zero crossing P of the fundamental frequency is the measure of the orientation angle θ. FIG. 11c shows the data pattern of the above higher harmonics corresponding to the data character or the like, for example any alpha numeric character.

As an example, a data pattern comprising of equal amplitudes of the $4^{th}$, $6^{th}$, $10^{th}$, and $12^{th}$ harmonics of the fundamental frequency harmonics is added to the transmitted angular orientation measurement polarized RF scanning reference source 214 component of the scanning polarized RF reference sources-based system embodiment 215 of FIG. 8. FIGS. 12a and 12b show the received signal by the fixed or moving object/platform that is provided with the cavity sensor receiver 216 component of the scanning polarized RF reference sources-based system embodiment 215, FIG. 8. The signal is considered to be transmitted and received in an environment that results in a signal-to-noise ratio (SNR) of −9.4 dB.

FIG. 12a presents the demodulated noisy data, and FIG. 12b shows the original data pattern comprising of the $4^{th}$, $6^{th}$, $10^{th}$, and $12^{th}$ harmonics of the fundamental frequency harmonics. The recovered data pattern (dashed line) has harmonic amplitudes of [1.0 1.07 0.16 0.83 0.83]. It is appreciated by those skilled in the art that without the a priori knowledge of scan patterns, the received data could not have been recovered from this noisy data set. Furthermore, it should be noted that orientation angle information and the previously described zero-time reference are not required for recovery of data at the object/platform.

It is also appreciated by those skilled in the art that other pairs of cosine and sine functions with frequencies $2n\omega$ and $(2n+1)\omega$, respectively, where n is an integer of 2 or higher, may also be added to the orthogonal synchronized polarized electric field signals $E_x(t)$ and $E_y(t)$, respectively, to similarly obtain two added measurement for the angle θ and reference zero-time, thereby making its measurement even more accurate.

It is appreciated by those skilled in the art that the harmonics in the orthogonal synchronized polarized electric field signals $E_x(t)$ and $E_y(t)$, respectively, which are assigned to angular orientation measurement, may be arbitrarily selected, as long as in addition to the same amplitude fundamental frequency harmonic, pairs of cosine and sine functions with frequencies $2n\omega$ and $(2n+1)\omega$, respectively, where n is an integer of 2 or higher, are also used determine when they are in phase, thereby providing for the measurement of the angle θ and reference zero-time as it was previously described. It is also appreciated that as it was previously described, the amplitudes of the above pairs of cosine and sine functions may still be similarly used for data communication purposes.

It is also appreciated by those skilled in the art that many other harmonics that are not used for either angular orientation or communication date may also be added to the orthogonal synchronized polarized electric field signals $E_x(t)$ and $E_y(t)$, respectively, that are transmitted by the polarized RF scanning reference source 214 component of the scanning polarized RF reference sources-based system embodiment 215 of FIG. 8 and used for the purpose of preventing an adversary from deciphering either angular orientation or communication data even if the very noisy and very low SNR signal is detected, even though it is hidden in the environmental noise.

It is also appreciated by those skilled in the art that variation of the frequency of the fundamental harmonic, i.e., ω in equations 2 and 3 or 5 and 6 or 8 and 9, does not change the value of the measured angular orientation and the communication data. As a result, this provides a very powerful additional tool for making it almost impossible for an adversary to detect the transmitted signals by randomly varying the fundamental frequency of the orthogonal synchronized polarized electric field signals $E_x(t)$ and $E_y(t)$, respectively.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A system comprising:
 a polarized RF scanning reference source comprising:
  first and second transmitter antennas for transmitting first and second reference scanning pattern waveforms, respectively;
  an amplitude modulation transmitter;
  a transmitter clock; and
  a transmitter processor configured to:
   receive a first timing input from the transmitter clock;
   generate the first and second reference scanning pattern waveforms;
   output the first and second reference scanning pattern waveforms to the first and second transmitter antenna, respectively; and
 one or more cavity sensor receivers, each comprising:
  one or more cavity sensors for receiving the transmitted first and second reference scanning pattern waveforms, respectively;
  an amplitude modulation receiver for receiving an output from the one or more cavity sensors for each of the first and second scanning pattern waveforms;
  a sensor clock; and
  a sensor processor configured to:
   receive a second timing input from the sensor clock;
   apply Fourier integration to extract a fundamental frequency and at least a fundamental frequency and two predetermined harmonics from the received output from the one or more cavity sensors;
   identify a time identified by the sensor clock at which the two predetermined harmonics are in phase and a time of zero crossing of the fundamental frequency harmonic; and
   determine a reference time of the reference clock for the received first and second reference scanning pattern waveforms.

* * * * *